United States Patent [19]

Smith et al.

[11] Patent Number: 5,100,232
[45] Date of Patent: Mar. 31, 1992

[54] APPARATUS AND METHOD FOR DETECTING HIDDEN MARKS ON PROGRESSIVE ASPHERIC OPHTHALMIC LENSES

[75] Inventors: Luther Smith, Dudley; John T. Winthrop, Wellesley, both of Mass.

[73] Assignee: American Optical Corporation, Southbridge, Mass.

[21] Appl. No.: 609,366

[22] Filed: Nov. 5, 1990

[51] Int. Cl.⁵ .............................................. G01B 9/00
[52] U.S. Cl. .................................................. 356/124
[58] Field of Search ..................... 356/124, 124.5, 125

[56] References Cited

U.S. PATENT DOCUMENTS

| | | | |
|---|---|---|---|
| 2,107,553 | 2/1938 | Tillyer | 356/125 |
| 3,332,320 | 7/1967 | Lueck | 356/125 |
| 4,039,827 | 8/1977 | Zdrok et al. | 250/271 |
| 4,194,814 | 3/1980 | Fischer et al. | 351/160 H |
| 4,564,291 | 1/1986 | Yoshino et al. | 356/125 |

Primary Examiner—Richard A. Rosenberger
Attorney, Agent, or Firm—Fishman, Dionne & Cantor

[57] ABSTRACT

A device for detecting hidden marks on progressive aspheric ophthalmic lens is disclosed. The device includes a housing, a light source within the housing, a magnifying lens mounted above the housing and a target element mounted within the housing between the light source and the magnifying lens. A progressive aspheric ophthalmic lens is supported by the housing at a position between the target element and the magnifying lens. A light beam is directed from the light source through the target element, the ophthalmic lens and the magnifying lens. The ophthalmic lens is then visually inspected through the magnifying lens against a background provided by the target element to detect the hidden marks.

6 Claims, 2 Drawing Sheets divide# APPARATUS AND METHOD FOR DETECTING HIDDEN MARKS ON PROGRESSIVE ASPHERIC OPHTHALMIC LENSES

BACKGROUND OF THE INVENTION

Conventional progressive aspheric ophthalmic lenses carry "hidden" marks that allow the dispenser to identify the manufacturer of the lens and reconstruct the layout geometry of the lens. Two types of hidden marks are in conventional use.

One type of hidden mark ("R"- type marks) comprise slightly raised or slightly depressed, smooth-sided marks refract light rays very slightly. The R-type marks may be viewed under conditions wherein a high contrast border aligned with the sides of the mark acts as a reverse contrast background for the few rays of light that are bent by the mark to enter the eye. Areas adjacent to the R-type mark send either more or fewer light rays to the eye than does the area of the mark, thereby creating a visible difference in light intensity between the R-type mark and its surroundings. For example, hidden marks may be viewed by holding a marked lens at arms length and scanning the area of the hidden marks across the edge of a still more distant light source.

Another type of hidden marks ("S"- type mark) comprises a very slightly raised or very slightly depressed, rough sided mark that scatters light rays. The S-type marks may be viewed by flooding the marked lens with a directed high intensity light beam and viewing the lens in a direction out of the beam i.e. at a nonzero angle relative to the longitudinal axis of the beam so that only rays scattered out of the beam by the mark toward the viewer are seen. The S-type marks appear as bright spots against a dark background using the above technique. Alternatively, a light beam may be reflected from the marked surface to the observer's eye and the S-type marks will appear as dark figures against a light background.

The task of reading either type of mark is visually fatiguing and the viewer is placed in a position in which it is awkward to display the mark to another viewer or to add more marks, e.g. by marking the surface of the lens with ink, to the lens in a controlled manner.

SUMMARY OF THE INVENTION

A device for detecting hidden marks on a progressive aspheric ophthalmic lens is disclosed. A light source for supplying a directed light beam is provided within a housing. A magnifying lens is mounted above the housing and means for mounting a progressive aspheric ophthalmic lens between the light source and the magnifying lens are provided. A target element is provided between the light source means and the means for mounting the ophthalmic lens. The target element includes a pattern of alternating opaque areas and transparent areas. Means for moving the target element axially between the light source means and the means for mounting the ophthalmic lens are also provided within the housing.

A method for detecting hidden marks on progressive aspheric ophthalmic lenses is disclosed. The method includes providing a light source means for supplying a directed light beam, providing a magnifying lens in axial alignment with the light source, providing a target element between the light source and the magnifying lens. The target element provides a pattern of alternating opaque areas and transparent areas. The ophthalmic lens is placed between the target and the magnifying lens and a light beam is directed from the light source through the target, the ophthalmic lens and the magnifying lens to illuminate the ophthalmic lens. The operator views the ophthalmic lens and aligned target through the magnifying lens and adjusts the position of the target element so that the target element provides a coarse background against which the ophthalmic lens may be viewed. The user then visually inspects the ophthalmic lens through the magnifying lens against the coarse background to detect hidden marks. Refractive type hidden marks are visible as areas of contrasting light intensity against the coarse background. If no refractive hidden marks are detected the target element is replaced with an aperture and the lens is visually inspected for scattering type hidden marks.

DETAILED DESCRIPTION OF THE INVENTION

Figure 5:
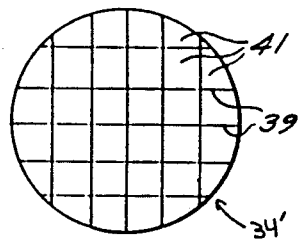
FIG. 5 shows a top view of an alternative embodiment of element 34.

The apparatus of the present invention is shown in like numbered FIGS. 1 through 6. A housing 2 includes a flat base, 4, a generally U-shaped front wall 6 extending perpendicularly from the flat base 4, a first top member 8 extending rearwardly from the top front wall 6 in a plane parallel to the flat base 4, a generally U-shaped back wall 10 extending perpendicularly from the flat base 4 and a second top member 12 extending forwardly from the top end of the back wall in same plane as the first top member 8.

A light source 14 is provided within the housing 2 near the base 4 of the housing 2. Preferably, the light source comprises a low wattage, clear bulb tungsten filament lamp 16. An enclosure 18 surrounds lamp 16. The enclosure defines a circular aperture 20 above the lamp 16.

A threaded rod 22 is rotatably secured between the base 4 and the first top element 8. A thumb wheel 24 is provided for manually rotating the threaded rod 22. A first end 26 of a horizontal support member 28 is threadably engaged with the threaded rod 22 so that rotation of the threaded rod 22 results in displacement of the horizontal support member 28 along the longitudinal axis of the threaded rod 22. A translucent diffuser element 32 and a target element 34 are supported near a second end 30 of the support member 28. An aperture 36 is defined in the support member 28 between the target element 34 and the second end 30 of the support member 28. The diffuser element 32 and target element 34 are shown in axial alignment with aperture 20. The horizontal support member 28 may be laterally displaced by pulling the first end 26 of the support member forwardly so that aperture 36, rather than diffuser element 32 and target element 34, is in axial alignment with aperture 20.

The target element 34 is a planar element defining a high contrast pattern of alternating opaque areas 38 and transparent areas 40. In the preferred embodiment shown in FIG. 4, the target pattern comprises a pattern of alternating opaque and transparent squares. Preferably, each of the squares is the same size as each of the other squares and the sides of each square are between 0.2 mm and 4 mm. Most preferably the sides of each square are between 0.5 mm and 2 mm in length. Preferably, the transparent squares are amber colored. Alternatively, a target element 34' may define a pattern of opaque lines 39 and transparent areas 41 as shown in FIG. 5.

A vertical support member 42 extends upwardly from the second top member 12. Rotatable member 43 is rotatably mounted on member 42. Horizontal support member 44 extends horizontally from rotatable member 43. A magnifying lens 46 extends outwardly from horizontal support member 44 and is asymmetrically mounted on the member 44 so that the lens 46 may, by rotation of rotatable member 43, be oriented in a plane parallel to that of target element 34 and axially aligned with the target element 34 and with the diffuser element 32 and aperture 20 in either an upper position, shown in unbroken lines, or a lower position, shown in broken lines. The magnifying lens 46 is shown in the upper position.

A progressive aspheric ophthalmic lens 48 is shown mounted in position for inspection. A support plate 50 is supported on the first top surface 8 and the second top surface 12 of housing 2. The support plate 50 defines a circular aperture 52. The ophthalmic lens 48 is supported on the support plate 50 over the circular aperture 52 between the magnifying lens 46 and the target element 34 and in axial alignment with the magnifying lens 46, the target element 34, the diffuser 32 and the aperture 20.

DESIGN PRINCIPLES

In the present invention the front focal plane of a positive power, i.e. magnifying, lens is "tiled" with a repeating pattern of opaque areas alternating with diffusely transmitting areas. Illumination of the pattern will fill the image space of the lens with a family of light beams each as large as allowed by the lens aperture and each member of which can be said to have a principal direction.

Figure 6:
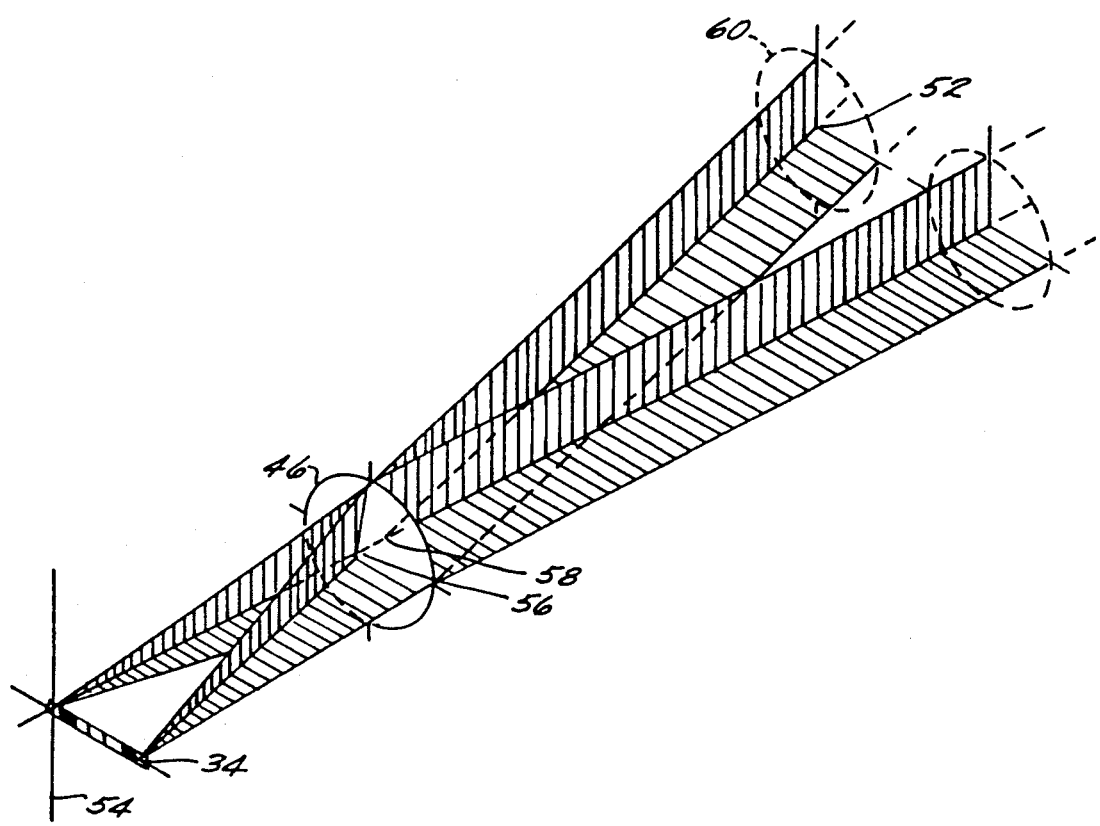
FIG. 6 shows a schematic view of the optical system of the present invention.

As shown schematically in FIG. 6, that principal direction 52 can be illustrated in a drawing of the optical system by drawing a straight line from any transilluminated point of the target 34 disposed in the back focal plane 54 through the front principal point 56 of the lens 46 and extending it from the back principal point 58 into the image space 60. Thus, the two dimensional repeating pattern of the focal plane target can be seen to give rise to a fan of beams extending in two dimensional angular space on the other side of the lens 46.

If when a directional photoreceptor, e.g. an eye, views the lens 46 against this field, light will be seen if the direction of gaze coincides with a fan of principal rays but no light will be seen if the direction is changed to one in between any two fans.

Suppose, now, a transparent member is introduced into the optical system of FIG. 6 between the lens 46 and the image space 60. In the simplest case, the member is without refractive power and all the beams emerge from the member unchanged in direction. If there is an area on the member that is weakly refractive (e.g. an R-type hidden mark), then those rays from each fan of rays that transect the refractive area will be deviated slightly in direction. It is possible, then for the eye, while gazing in a direction corresponding to no fans of rays as transmitted through the non-refractive neighborhood of the hidden mark, to receive light transmitted and refracted by the hidden mark. The hidden mark will become visible as a bright area against a dark background. Conversely, a shift of the transparent member can cause the angular conditions to change so that the neighborhood of the hidden mark transmits light to the eye while the hidden mark refracts such light so as to miss the pupil of the eye so that the hidden mark appears as a dark area against a bright background.

These conditions are repeated for each of the ray fans radiating from the target mosaic, so as the eye shifts location without changing direction of gaze, the hidden marks will appear and disappear. Therefore, not all mosaics are equally effective for revealing the hidden marks. This occurs because the marks themselves (which are weakly refractive by design) have a finite angular size as viewed from the assumed position of the eye. Typically, when conditions are just right angularly to show one edge of the mark to best advantage, they will not be just right to show another edge. Best visibility of the hidden mark is achieved by sizing the target mosaic so that its basic pattern has the same angular size at the lens 46 as does the hidden mark (or the features by which it is recognized) as viewed by the eye.

For example, we can refer to block alphanumeric characters $2 \text{ mm} \times 2 \text{ mm}$ in typeface viewed at 254 mm (10 in.). The angular subtense of the characters is $2/254 = 0.0079$ radian. According to this invention, best visibility will be obtained by using a target pattern of alternating dark and light squares aligned to the sides and crossbars of the characters. If the squares are $0.508 \times 0.508$ mm, they should be located in the focal plane of a $0.0079/0.000508 = 15.6$ diopter (efl = 64.3 mm) lens. If the squares are $2 \text{ mm} \times 2 \text{ mm}$, they should be located in the focal plane of a $0.0079/0.002 = 3.95$ diopter (efl = 253 mm) lens.

Figure 3:
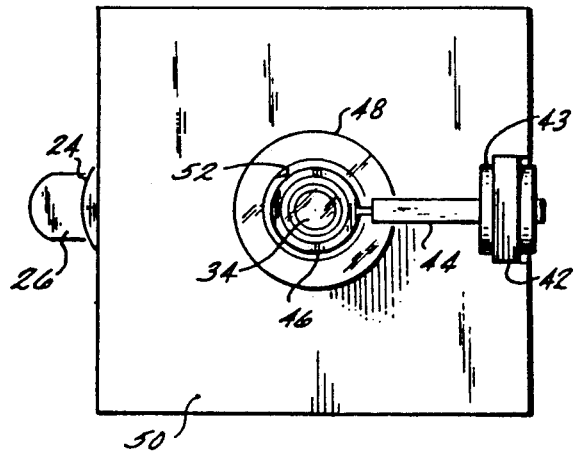
FIG. 3 shows a top view of the device of the present invention.
Figure 4:
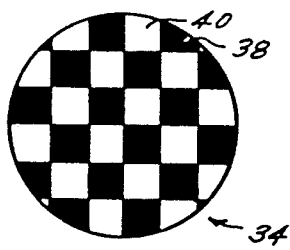
FIG. 4 shows a top view of the embodiment of element 34 shown in FIGS. 1-3.
Figure 2:
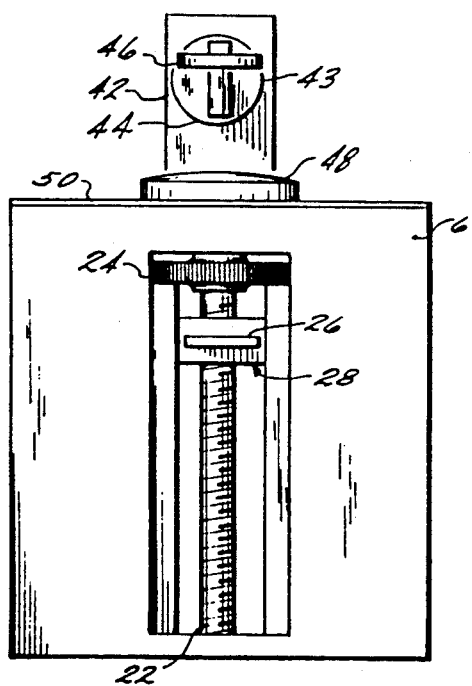
FIG. 2 shows the front view of the device of the present invention.
Figure 1:
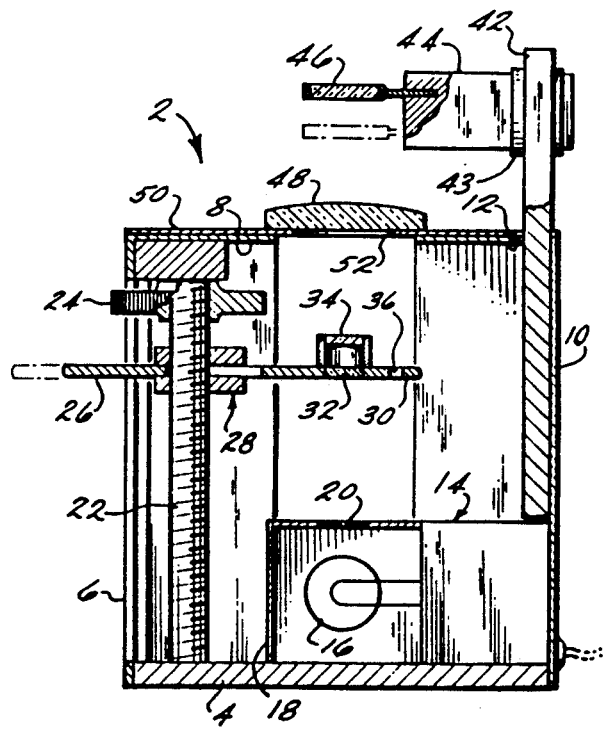
FIG. 1 shows a cross sectional view of the device of the present invention.

If the member with hidden marks has refractive power in addition to that of the marks and/or it is placed, as in the preferred embodiment of the present invention shown in FIGS. 1-3, between the target and the positive lens, then the target spacing and axial location must be adjusted so that the target is (a) at the front focus of the member plus lens combination; and, (b) produces families of beams with angular spacings equal to the apparent angular subtense of the hidden marks or their distinguishing features.

METHOD OF USING THE HIDDEN MARK VIEWER

The user activates light source 14 to direct a light beam through aperture 20, diffuser 32, target element 34 and magnifying lens 46 and then adjusts the axial position of the support member 22 and target element 34 to a "neutral", i.e. mid-range, position by rotating thumbwheel 24. The target 34 appears as a hazy, out-of-focus cross hatch pattern when viewed through magnifying lens 46. The user introduces the ophthalmic lens 48 into the optical system. A single lens is supported on plate 50. Spectacles already glazed into frames may be examined by removing plate 50 and allowing the temples of the frame to pass between members 8 and 12 of the housing. If the ophthalmic lens 48 to be examined is a thick lens, e.g. a semifinished blank, the magnifying lens 46 should be placed in the upper position. Thin lenses are more easily examined with the magnifying lens 46 in the lower position.

If the lens marking is not known, or is known to be an R-type marking, the target member is left in the optical system. The axial position of the support 28 and target member 34 is adjusted by rotating thumbwheel 24 so that the target pattern seen as a background to the lens 48 is as coarse as possible, i.e. the position of the target member is adjusted axially upwardly if lens 48 is a positive power lens, and is adjusted axially downwardly if lens 48 is a negative power lens. Precise adjustment of the axial position of target element 34 is not necessary in order to reveal hidden R-type marks, but the coarser the background pattern, i.e. the closer the target element 34 is to the front focus of the lens 46 and lens 48 combination, the more completely the mark will be seen. If a hidden R-type mark is revealed, the user may easily mark, i.e. ink, the location of the R-type mark by e.g. guiding a felt tip pen under the magnifying lens 46 to touch the surface of lens 48 on or near the revealed R-type mark.

If no R-type hidden marks are seen, the ophthalmic lens 48 is either marked with R-type marks that are too weakly refractive to see, marked with S-type hidden marks or has no marks.

To detect S-type marks, the user pulls the first end 26 of the horizontal support 28 forwardly to align aperture 36 with aperture 20. The user then visually inspects the ophthalmic lens 48 through magnifying lens 46 at a nonzero angle relative to the axis defined by the aligned light source aperture 20, aperture 36, ophthalmic lens 48 and magnifying lens 46 so that the surface of the ophthalmic lens 46 is viewed against a dark background surrounding the aperture 36. S-type hidden marks are visible as bright spots against the dark background when this technique is used. It should be noted that both the ophthalmic lens 48 and the magnifying lens 46 must be very clean for success at finding an S-type mark because the S-type marks themselves are scarcely more visible than smudges or lint on the lens surface.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method for detecting hidden marks on a progressive aspheric ophthalmic lens, said marks having an apparent angular subtense, comprising:

providing a light source means for supplying a directed light beam;

providing a magnifying lens perpendicular to and in axial alignment with the directed light beam;

providing a target element between the light source means and the magnifying lens, said target element having a pattern of opaque areas and transparent areas thereon;

placing the ophthalmic lens between the target element and the magnifying lens, wherein the combination of the ophthalmic lens and the magnifying lens defines a front focus;

directing a light beam from the light source through the target element, ophthalmic lens and magnifying lens to illuminate the ophthalmic lens;

viewing the ophthalmic lens and aligned target element through the magnifying lens;

adjusting the position of the target element so that the pattern of the target element provides a coarse background against which the ophthalmic lens may be viewed, wherein the position of the target element is adjusted to substantially coincide with the front focus of the combination of the magnifying lens and the ophthalmic lens so that the target element directs groups of light beams having angular spacings substantially equal to the apparent angular subtense of the hidden marks toward the ophthalmic lens;

visually inspecting the ophthalmic lens through the magnifying lens against the coarse background to detect hidden marks;

wherein refractive hidden marks are visible as contrasting areas against the coarse background.

2. The method of claim 1, further comprising, if no refractive hidden marks are visible, replacing the diffuser element and target element with an opaque member, said opaque member having a aperture therethrough; and said aperture being axially aligned with the light source, ophthalmic lens and magnifying lens;

visually inspecting the ophthalmic lens through the magnifying lens at a nonzero angle relative to a vertical axis which passes through the aligned light source, aperture, ophthalmic lens and magnifying lens to detect light-scattering hidden marks;

wherein light-scattering hidden marks are visible as bright spots against a dark background.

3. The device of claim 1, wherein the target element comprises a pattern of alternating opaque squares and transparent squares.

4. The device of claim 3, wherein the sides of each of the squares are equal in length and are each between 0.2 mm and 4 mm in length.

5. The device of claim 4, wherein the sides of the squares are each between 0.5 mm and 2 mm in length.

6. The device of claim 3, wherein the transparent squares are amber colored.

* * * * *